(12) United States Patent
Komatsu et al.

(10) Patent No.: US 6,514,614 B1
(45) Date of Patent: Feb. 4, 2003

(54) COATED NUCLEUS FOR A CULTURED PEARL

(75) Inventors: Hiroshi Komatsu, Taito-ku (JP); Hiroshi Ito, Shinjuku-ku (JP)

(73) Assignee: Koken Co. Ltd, Tokyo (JP)

( * ) Notice: Subject to any disclaimer, the term of this patent is extended or adjusted under 35 U.S.C. 154(b) by 0 days.

(21) Appl. No.: 09/572,370

(22) Filed: May 18, 2000

(51) Int. Cl.⁷ .................................................. B32B 5/16
(52) U.S. Cl. ........................ 428/402; 428/403; 428/404; 428/407
(58) Field of Search .................................. 428/402, 403, 428/404, 407

(56) References Cited

U.S. PATENT DOCUMENTS

| | | | | |
|---|---|---|---|---|
| 5,480,844 A | * | 1/1996 | Matsui | 501/3 |
| 5,749,319 A | * | 5/1998 | Hinose | 119/244 |

* cited by examiner

*Primary Examiner*—Leszek Kiliman
(74) *Attorney, Agent, or Firm*—Sherman & Shalloway

(57) ABSTRACT

The present invention is a coated nucleus for a cultured pearl whose surface is coated with water soluble polymer, characterizing over 25% of total coated amount of said water soluble polymer is dissolved by soaking said coated nucleus into seawater of 15° C. temperature for 30 minutes.

15 Claims, No Drawings

COATED NUCLEUS FOR A CULTURED PEARL

BACKGROUND OF THE INVENTION

The present invention related to a nucleus to be inserted into shellfish at the cultivation of the cultured pearl.

DESCRIPTION OF THE PRIOR ART

It is well-known that, when a particle of solid such as sand or others is inserted into the specific kind of shellfish, a small grain of pearl is produced naturally. However, the production of natural pearl is uncertain, and the size of an obtained natural pearl is not so large and also the shape of it is indefinite. About one hundred years ago, the technique to culture a pearl by inserting a nucleus artificially into a mother shellfish such as pearl oyster, white-lip pearl oyster, black-lip pearl oyster, penguin wing oyster, abalone, hyriopsis schlegel, mussel, anodonta woodiana, or fresh water pearl mussel was developed in Japan. This technique is gradually improved, and now it becomes possible to culture a large size pearl certainly. Recently, almost 100% of ornamental pearls are produced by said culture technique.

However, recently, the environment surrounding an aqua farm for cultivation are gradually becoming worse, and by the conventional culture technique, the breeding of mother shellfish for several years after inserting of nucleus becomes very difficult. Further, by the affect of breeding environmental pollution, survival ratio of mother shellfish is remarkably deteriorated.

BRIEF SUMMARY OF THE INVENTION

The object of the present invention is to improve the yield of large size pearl and to reduce the ratio of death of mother shellfishes.

The inventors of the present invention have found that above mentioned problems can be solved by the use of a coated nucleus for a cultured pearl whose surface is coated with water soluble polymer, characterizing over 25% of total coated amount of said water soluble polymer is dissolved by soaking said coated nucleus into seawater of 15° C. temperature for 30 minutes, and accomplished the present invention.

By the use of a coated nucleus of this invention, when said coated nucleus is inserted into a mother shellfish, the load to the mother shellfish can be reduced, because water soluble polymer that coats a nucleus is partially dissolved and the friction and resistance at the inserting action is weakened. Consequently, the yield of large size pearl can be improved, and the ratio of death of mother shellfishes can be reduced. Further, the present invention contains a substance that has antibacterial activity as a part of coating component. Said substance having antibacterial activity dissolves together with a coating material and acts to an incised part of the mother shellfish to insert the coated nucleus and prevent the infection due to said antibacterial activity. Thus, the coated nucleus of this invention can further reduce the ratio of death of mother shellfishes.

DETAILED DESCRIPTION OF THE INVENTION

The important point of a coated nucleus for a cultured pearl of this invention is illustrated in detail as follows.

That is, the coated nucleus of this invention is a nucleus for culture whose surface is coated by water soluble polymer, and after coated, it is necessary that over 25% of total coating amount of said water soluble polymer is dissolved when placed in the seawater of 15° C. temperature, that is a culture condition of a mother shellfish, for 30 minutes. The solubility of the coated polymer depends on a kind of coated material, coating amount and a coating method. However, in any case it is necessary that over 25% of total coating amount is dissolved, and if the dissolving ratio is under 25%, the reduction of the friction and resistance at the inserting action is not sufficient.

As the water soluble polymer, although any kinds of natural or synthetic polymer can be used, especially, natural water soluble polymer is desirably used. As the natural polymer, protein, polysaccaride or lipid can be mentioned. As the concrete example, collagen, gelatin, casein, albumin, elastin, alginic acid, pectin, arabic gum, carrageenan, xanthane gum, pullulan, starch or derivatives of these compound for example, succinyl collagen, methyl collagen, acetyl collagen, phthalic collagen, succinyl gelatin, methyl gelatin, acetyl gelatin, phthalic gelatin, carboxymethyl starch, methylhydroxy starch, methyl cellulose, ethyl cellulose, hydroxyethyl cellulose and carboxymethyl cellulose can be mentioned. Still more, synthetic water soluble polymer can be used, and concretely, polyvinyl alcohol, polyvinyl pyrrolidone, carboxyvinyl polymer, polyacrylic acid and salt thereof, polyacrylamide, polyethylene glycol and these derivatives can be mentioned. And, the combination of these compounds, concretely mixed solution of these compounds is used. After coating a layer, another layer can be coated over the layer. Thus the multiple layers can be prepared by coating a layer one by one.

The substance that has antibacterial activity can also be contained in a coating layer. As the substance having antibacterial activity, any kinds of substance that has antibacterial activity including bacteria controlling activity can be used and not restricted. Concretely, an antibiotic, a silver containing compound, a preservative or a conservative can be mentioned, and especially an antibiotic is desirably used. As the concrete examples, tetracycline, tetracycline hydrochloride, kanamycin, sulfamonomethoxyne, sodium salt of sulfamonomethoxyne or ampicillin, which are ordinary antibiotic in the marine products industries can be mentioned. Necessary amount to be added to a coating layer of each substance having antibacterial activity are depending to the intensity of it's antibacterial activity, therefore, the concrete amount to be added is not definite, however, in a case of antibiotic, the desirable amount to be added is 0.1–20 times to the amount of coated material.

In this invention, a method for coating is not restricted, and whole surface of a nucleus can be coated homogeneously or partially. As the concrete coating method, for example, following methods can be mentioned. A method to soak a nucleus into the solution containing coating materials then dried up, or a method to spray the solution containing coating materials over the surface of a nucleus then dried up can be mentioned. Actually, a coating apparatus which is on the market (for example, HIGH COATER; product of Froint Industries Co., Ltd.) can be used.

The concentration, pH or temperature of aqueous solution of water soluble polymer is not restricted. However, in regard to the concentration, the viscosity of solution affects largely the coating process and when the viscosity is too high, the coating becomes very difficult. Concretely, it is necessary for the coating solution to have a viscosity as measured by following method. That is, when a container containing said coating solution is inclined, contained solution which has adequate viscosity must be flown along with the motion of the container.

pH value of the aqueous solution of water soluble polymer used for the coating of this invention is also not restricted. In general, as a nucleus to be inserted into mother shellfish, a small grain cut from a shell of shellfish then processed is used, whose main component is calcium carbonate. Therefore, if the pH value of the solution is smaller than 1, it is not desirable because the nucleus can be dissolved in the solution. And when the nucleus is inserted in the mother shellfish, pH of the inserted nucleus becomes same to the body fluid of the shellfish because the body of shellfish surrounds it. In a case, if a water soluble polymer which has strong electric charge is used, it is desirable to use the solution whose pH is near the neutral range.

The temperature of the solution is not restricted as long as the temperature affects the nucleus. And, it is possible to raise the temperature of solution to reduce the viscosity, or to expedite the drying. According to the kind of water soluble polymer, sometimes the temperature of solution is restricted. Actually, it is necessary to adjust the temperature of solution in the limit in which contained water soluble polymer is not denatured or decomposed by the effect of the temperature. Further, it is possible to add the component which does not give any effects to the mother shellfish.

The coated amount of water soluble polymer is not restricted, however, if the coating amount is too small, the sufficient effect can not be expected. And if the coated amount is too much, the inserting action of a nucleus becomes difficult because of high viscosity of water soluble polymer. Concretely, it is desirable that the coated part of a nucleus is bigger than 30% of the total surface area of a nucleus and the thickness of most thick part of coated layer is thinner than 1 mm.

As the kinds of material to be coated, one kind of water soluble polymer can be used alone or various kinds of water soluble polymer can be used together with. Further, after the first layer is coated, another layer composed of different kind of water soluble polymer can be accumulated.

EXAMPLE

The present invention will be more minutely illustrated along with the Examples, however, not intend to limit the scope of the claims of this invention.

Example 1

0.2% aqueous solution (pH3) of succinyl aterocollagen, which is prepared by succinyl denaturation of enzyme solubilizated collagen (aterocollagen) by means of conventional method, is coated over the surface of a nucleus using a coating apparatus (product of Froint Industries Co., Ltd., HCT-MINI) wherein spraying pressure is adjusted to 1 kg/cm$^2$ and rotating speed of pan is adjusted to 20 r.p.m. In this Example, 300 ml of succinyl aterocollagen aqueous solution is used to 600 g of nucleus, and a coated nucleus for cultured pearl is obtained.

After soaking 100 g of said obtained coated nucleus for cultured pearl into seawater of 15° C. temperature for 30 minutes, the amount of collagen contained in said seawater is measured by a burette quantitative analytical method. The collagen content in said seawater is 37 mg. Meanwhile, 100 g of coated nucleus for cultured pearl specimen is separately soaked into seawater, then raise the temperature of said seawater to 60° C. and left for 15 minutes so as to dissolve all amount of coated collagen. The total amount of collagen is measured and the result is 87 mg. According to the above mentioned results, the calculated amount of collagen extracted into 15° C. seawater during 30 minutes is 43% to the total coated weight.

Example 2

Succinyl aterocollagen used in Example 1 is heated to 60° C. and denatured and succinyl gelatin is obtained. 10% aqueous solution of the obtained succinyl gelatin (pH 3.5) is coated over the surface of a nucleus using a coating apparatus (product of Froint Industries Co., Ltd., HCT-MINI) by same condition to Example 1, and a coated nucleus for cultured pearl is obtained.

After soaking 100 g of said obtained coated nucleus for cultured pearl into seawater of 15° C. temperature for 30 minutes, the amount of gelatin contained in said seawater is measured by a burette quantitative analytical method. The gelatin content in said seawater is 64 mg. Meanwhile, 100 g of coated nucleus for cultured pearl specimen is separately soaked into seawater, then raise the temperature of said seawater to 60° C. and left for 15 minutes so as to dissolve all amount of coated gelatin. The total amount of gelatin is measured and the result is 93 mg. According to the above mentioned results, the calculated amount of gelatin extracted into 15° C. seawater during 30 minutes is 67% to the total coated weight.

Example 3

To 0.1% aqueous solution (pH 3) of succinyl aterocollagen used in Example 1, same amount of tetracycline hydrochloride as collagen is added, and the aqueous solution for coating is prepared. Using this aqueous solution, and by same condition to Example 1, a coated nucleus for cultured pearl is obtained.

After soaking 100 g of said obtained coated nucleus for cultured pearl into seawater of 15° C. temperature for 30 minutes, the amount of collagen contained in said seawater is measured by burette quantitative analytical method. The collagen content in said seawater is 20 mg. Meanwhile, 100 g of coated nucleus for cultured pearl specimen is separately soaked into seawater, then raise the temperature of said seawater to 60° C. and left for 15 minutes so as to dissolve all amount of coated collagen. The total amount of collagen is measured and the result is 47 mg. According to the above mentioned results, the calculated amount of collagen extracted into 15° C. seawater during 30 minutes is 43% to the total coated weight.

Example 4

To 0.1% aqueous solution (pH 3) of alkali solubilizated aterocollagen, same amount of tetracycline hydrochloride as collagen is added, and the aqueous solution for coating is prepared. Using this aqueous solution, and by same condition to Example 1, a coated nucleus for cultured pearl is obtained.

After soaking 100 g of said obtained coated nucleus for cultured pearl into seawater of 15° C. temperature for 30 minutes, the amount of collagen contained in said seawater is measured by a burette quantitative analytical method. The collagen content in said seawater is 20 mg. Meanwhile, 100 g of coated nucleus for cultured pearl specimen is separately soaked into seawater, then raise the temperature of said seawater to 60° C. and left for 15 minutes so as to dissolve all amount of coated collagen. The total amount of collagen is measured and the result is 46 mg. According to the above mentioned results, the calculated amount of collagen extracted into 15° C. seawater during 30 minutes is 43% to the total coated weight.

Example 5

After 600 g of nucleus grains are soaked into 500 ml of 0.2% aqueous solution (pH 3) of succinyl aterocollagen used in Example 1, said nucleus grains are took out and dried up by blowing 50° C. hot air with shaking the nucleus grains. Thus, a coated nucleus for cultured pearl is obtained.

After soaking 100 g of said obtained coated nucleus for cultured pearl into seawater of 15° C. temperature for 30 minutes, the amount of collagen contained in said seawater is measured by a burette quantitative analytical method. The collagen content in said seawater is 124 mg. Meanwhile, 100 g of coated nucleus for cultured pearl specimen is separately soaked into seawater, then raise the temperature of said seawater to 60° C. and left for 15 minutes so as to dissolve all coated collagen. The total amount of collagen is measured and the result is 322 mg. According to the above mentioned results, the calculated amount of collagen extracted into 15° C. seawater during 30 minutes is 39% to the total coated weight.

Example 6

To 100 ml of 5% pectin aqueous solution (pH 3.5) half as much amount of tetracycline hydrochloride as pectin is added, and the solution for coating is prepared. Using this aqueous solution, and by same condition to Example 1, a coated nucleus for cultured pearl is obtained.

After soaking 100 g of said obtained coated nucleus for cultured pearl into seawater of 15° C. temperature for 30 minutes, the amount of pectin contained in said seawater is measured by carbazole-sulfuric acid quantitative analytical method. The pectin content in said seawater is 0.89 g. Meanwhile, 100 g of coated nucleus for cultured pearl specimen is separately soaked into seawater, then raise the temperature of said seawater to 60° C. and left for one hour so as to dissolve all amount of coated pectin. The total amount of pectin is measured and the result is 2.4 g. According to the above mentioned results, the calculated amount of pectin extracted into 15° C. seawater during 30 minutes is 37% to the total coated weight.

Example 7

By same process to Example 6 except using alginic acid instead of pectin, a coated nucleus for cultured pearl is obtained.

After soaking 100 g of said obtained coated nucleus for cultured pearl into seawater of 15° C. temperature for 30 minutes, the amount of alginic acid contained in said seawater is measured by carbazole-sulfuric acid quantitative analytical method. The alginic acid content in said seawater is 0.71 g. Meanwhile, 100 g of coated nucleus for cultured pearl specimen is separately soaked into seawater, then raise the temperature of said seawater to 60° C. and left for one hour so as to dissolve all amount of coated alginic acid. The total amount of alginic asid is measured and the result is 2.0 g. According to the above mentioned results, the calculated amount of alginic acid extracted into 15° C. seawater during 30 minutes is 36% to the total coated weight.

Example 8

To 100 ml of 5% polyvinyl alcohol solution (pH 3.5) half as much amount of tetracycline hydrochloride as polyvinyl alcohol is added, and the solution for coating is prepared. Using this aqueous solution, and by same condition to Example 1, a coated nucleus for cultured pearl is obtained.

After soaking 100 g of said obtained coated nucleus for cultured pearl into seawater of 15° C. temperature for 30 minutes, the amount of polyvinyl alcohol contained in said seawater is measured by HPLC analytical method. The polyvinyl alcohol content in said seawater is 0.71 g. Meanwhile, 100 g of coated nucleus for cultured pearl specimen is separately soaked into seawater, then raise the temperature of said seawater to 60° C. and left for one hour so as to dissolve all amount of coated polyvinyl alcohol. The total amount of polyvinyl alcohol is measured and the result is 2.3 g. According to the above mentioned results, the calculated amount of polyvinyl alcohol extracted into 15° C. seawater during 30 minutes is 31% to the total coated weight.

Example 9

By same process to Example 8 except using polyethylene glycol instead of polyvinyl alcohol, a coated nucleus for cultured pearl is obtained.

After soaking 100 g of said obtained coated nucleus for cultured pearl into seawater of 15° C. temperature for 30 minutes, the amount of polyethylene glycol contained in said seawater is measured by HPLC analytical method. The polyethylene glycol content in said seawater is 0.92g. Meanwhile, 100 g of coated nucleus for cultured pearl specimen is separately soaked into seawater, then raise the temperature of said seawater to 60° C. and left for one hour so as to dissolve all amount of coated polyethylene glycol. The total amount of polyethylene glycol is measured and the result is 2.0 g. According to the above mentioned results, the calculated amount of polyethylene glycol extracted into 15° C. seawater during 30 minutes is 46% to the total coated weight.

Experiments of nucleus for cultured pearl are carried out using the specimen of coated nucleus for cultured pearl obtained in Example 1 to 9 in comparison with a not coated nucleus. As the mother shellfish a pearl oyster is used. After a nucleus is inserted into a mother shellfish, the mother shellfish is cultured for one year. After one year, a cultured pearl is taken out from the mother shellfish, and the quality of pearl and the survival ratio of mother shellfishes are investigated and compared. The obtained results are summarized in Table 1. As clearly understood from Table 1, from the view points of quality and survival ratio, the coated nucleus for cultured pearl of this invention shows better results than that of not coated one.

The quality (index) in Table 1 is calculated as follows. That is, all obtained pearls are classified to several classes, and give a specified numerical point to each class. The specified numerical point is multiplied by number of pearls belonging to each class, obtained points of each class are summed and total number of points indicates the quality (index).

TABLE 1

| kind of nucleus | survival ratio (%) of shellfish | quality (index) of cultured pearl |
| --- | --- | --- |
| Example 1 | 82 | 164 |
| Example 2 | 86 | 155 |
| Example 3 | 92 | 170 |
| Example 4 | 80 | 123 |
| Example 5 | 82 | 141 |
| Example 6 | 86 | 110 |
| Example 7 | 92 | 109 |
| Example 8 | 90 | 107 |
| Example 9 | 82 | 109 |
| not coated nucleus (comparison) | 70 | 100 |

EFFECT OF THE INVENTION

As illustrated above, the coated nucleus for a cultured pearl of this invention makes it possible to obtain large size and high quality cultured pearls by high yield, by satisfying following important point. That is, when said coated nucleus is soaked into seawater of 15° C. for 30 minutes, over 25% of total coated amount of water soluble polymer is dissolved, and by satisfying this point, the friction and resistance at the inserting action of nucleus to mother shellfish is weakened.

What is claimed is:

1. A coated nucleus for cultured pearl whose surface is coated with a water soluble polymer, wherein over 25% by weight of the total coated amount of said water soluble polymer coating is dissolvable by soaking said coated nucleus in seawater at a temperature of 15° C. for 30 minutes.

2. The coated nucleus for a cultured pearl of claim 1, wherein a substance that has antibacterial activity is added to the water soluble polymer.

3. The coated nucleus for a cultured pearl of claim 1, wherein the water soluble polymer is a natural polymer.

4. The coated nucleus for a cultured pearl of claim 2, wherein the substance that has antibacterial activity is an antibiotic.

5. The coated nucleus for a cultured pearl of claim 1, which is prepared by soaking the nucleus for cultured pearl in a solution containing the water soluble polymer and drying the coating.

6. The coated nucleus for a cultured pearl of claim 1, which is prepared by spraying a solution of the water soluble polymer over the surface of the nucleus for a cultered pearl and drying the coating.

7. The coated nucleus for cultured pearl of claim 1, wherein the water soluble polymer is a synthetic polymer.

8. The coated nucleus for cultured pearl of claim 1, wherein the water soluble polymer coating has a thickness of 1 mm or less.

9. The coated nucleus for cultured pearl of claim 1, wherein over 25% by weight to 67% by weight of the total coated amount of said water soluble polymer is dissolvable in seawater at a temperature of 15° C. for 30 minutes.

10. A coated nucleus for cultured pearl whose surface is coated with a water soluble polymer, wherein over 25% by weight of the total coated amount of said water soluble polymer coating is dissolvable by soaking said coated nucleus in seawater at a temperature of 15° C. for 30 minutes, wherein the polymer is selected from the group consisting of collagen, gelatin and derivatives of collagen and gelatin.

11. The coated nucleus for a cultured pearl of claim 1, wherein a substance that has antibacterial activity is added to the water soluble polymer.

12. The coated nucleus for a cultured pearl of claim 1, wherein the water soluble polymer is a natural polymer.

13. The coated nucleus for a cultured pearl of claim 11, wherein the substance that has antibacterial activity is an antibiotic.

14. The coated nucleus for a cultured pearl of claim 10, which is prepared by soaking the nucleus for cultured pearl in a solution containing the water soluble polymer and drying the coating.

15. The coated nucleus for a cultured pearl of claim 10, which is prepared by spraying a solution of the water soluble polymer over the surface of the nucleus for a cultered pearl and drying the coating.

* * * * *